(12) United States Patent
Vogler et al.

(10) Patent No.: US 9,296,255 B2
(45) Date of Patent: Mar. 29, 2016

(54) DEVICE FOR THE ULTRASONIC PROCESSING OF A WORKPIECE

(75) Inventors: Ulrich Vogler, Uhldingen (DE); Klaus Schick, Karlsruhe (DE)

(73) Assignee: Herrmann Ultraschalltechnik GmbH & Co. KG, Karlsbad-Ittersbach (DE)

( * ) Notice: Subject to any disclaimer, the term of this patent is extended or adjusted under 35 U.S.C. 154(b) by 0 days.

(21) Appl. No.: 12/135,952

(22) Filed: Jun. 9, 2008

(65) Prior Publication Data

US 2008/0237299 A1    Oct. 2, 2008

Related U.S. Application Data

(63) Continuation of application No. PCT/EP2006/009902, filed on Oct. 13, 2006.

(30) Foreign Application Priority Data

Dec. 23, 2005    (DE) .......................... 10 2005 063 230

(51) Int. Cl.
*B06B 3/00* (2006.01)
*B60B 3/00* (2006.01)

(52) U.S. Cl.
CPC ....................................... *B60B 3/00* (2013.01)

(58) Field of Classification Search
CPC ....................................................... B06B 3/00
See application file for complete search history.

(56) References Cited

U.S. PATENT DOCUMENTS

| 4,647,336 | A | 3/1987 | Coenen |
| 5,603,444 | A | 2/1997 | Sato |
| 5,976,316 | A | 11/1999 | Mlinar |
| 6,547,903 | B1 | 4/2003 | McNichols |
| 6,786,384 | B1 | 9/2004 | Haregoppa |
| 7,303,110 | B2 * | 12/2007 | Zhai et al. ...................... 228/1.1 |
| 2004/0094603 | A1 | 5/2004 | Stegelmann |

FOREIGN PATENT DOCUMENTS

| DE | 44 39 284 A | 4/1996 |
| DE | 10115181 C | 9/2002 |
| EP | 0815955 | 1/1998 |
| WO | 2004/041449 | 5/2004 |

OTHER PUBLICATIONS

Definition of "between". http://www.merriam-webster.com/dictionary/between?show=0&t=1377104665. Accessed Aug. 21, 2013.*
International Search Report.

* cited by examiner

*Primary Examiner* — Kevin P Kerns
*Assistant Examiner* — Steven Ha
(74) *Attorney, Agent, or Firm* — Brinks Gilson & Lione

(57) ABSTRACT

The present disclosure relates to a device for the ultrasonic processing of a workpiece using an ultrasonic resonator and optionally a counter-die, the workpiece lying against the ultrasonic resonator and the ultrasonic resonator having a converter, a booster and a sonotrode. According to the disclosure, an additional booster is provided between the converter and the sonotrode and both boosters carry a holder for the ultrasonic resonator.

9 Claims, 2 Drawing Sheets

DEVICE FOR THE ULTRASONIC PROCESSING OF A WORKPIECE

CROSS-REFERENCE TO RELATED APPLICATIONS

Figure 1:
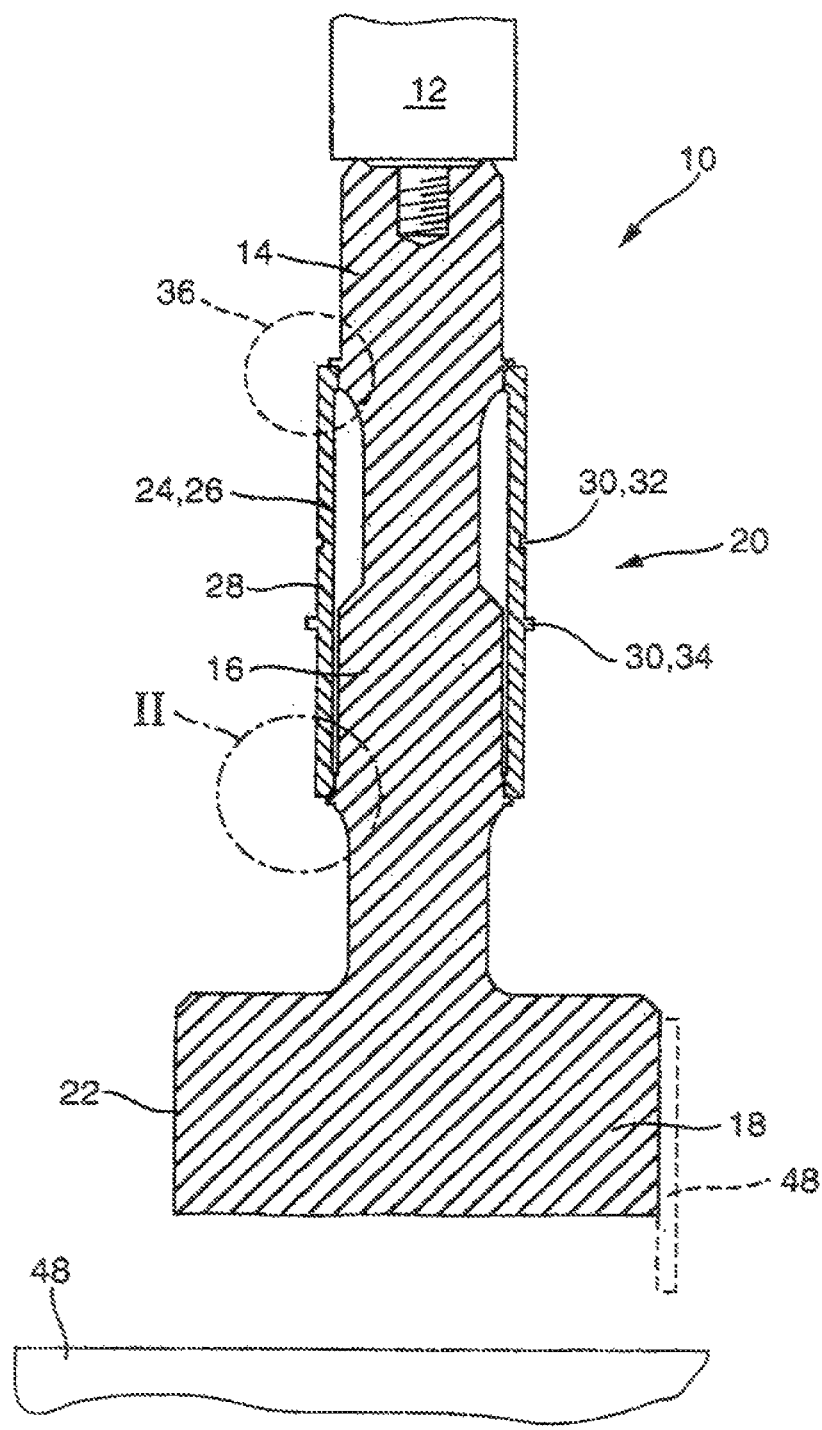

This application is a continuation of International Application No. PCT/EP2006/009902 filed on Oct. 13, 2006, which claims the benefit of DE102005063230.0, filed Dec. 23, 2005. The disclosures of the above applications are incorporated herein by reference.

FIELD

The invention relates to a device for the ultrasonic processing of a workpiece.

BACKGROUND

The statements in this section merely provide background information related to the present disclosure and may not constitute prior art.

Devices for the ultrasonic processing of a workpiece are known. For example, DE-A-44 39 284 shows such a device, which can be used for the ultrasonic welding of strip material. The ultrasonic resonator is fastened in that an oscillating module is provided with a peripheral collar and this peripheral collar is clamped in a retaining device. This peripheral collar must be located in an oscillation nodal point such that the longitudinal ultrasonic vibrations of the ultrasonic resonator are not transmitted to the mount, or only to a negligible extent.

Instead of fixed chucking, O-rings are also known, which bring about excellent vibration isolation. O-rings, however, are very soft in the radial and axial directions.

In addition, Z-shaped mounts are known, which can also be used to achieve excellent vibration isolation. This mount, however, is relatively soft in the radial direction and bending forces can be absorbed only to a limited extent. In addition, such a mount demands a relatively large amount of space. Such a mount is known, for example, from U.S. Pat. No. 6,547,903.

A further mounting system is known from U.S. Pat. No. 5,976,316. This mounting system also requires a relatively large amount of space in the circumferential direction.

SUMMARY

The present disclosure includes a device in that between the converter and the sonotrode a further booster is provided and in that the two boosters carry a mount for the ultrasonic resonator.

On the inventive device, it is provided that two boosters are used, which are disposed directly in series and together carry a mount, by which the ultrasonic resonator can be fastened or mounted to a frame. The ultrasonic resonator is therefore not grasped in one single contact point, but in two contact points, as a result of which higher retaining forces and above all also bending forces can be transmitted. The ultrasonic resonator can be disposed, for example, in a vertical orientation and supported on one side, wherein the workpiece is processed with the face of the sonotrode or on the circumference thereof. According to another embodiment, the ultrasonic resonator can be disposed, for example, in a horizontal orientation and supported on both sides, so that the workpiece, for example, a material web or the like, is processed by the circumferential surface of the sonotrode. The support in this embodiment can be configured as a pivot bearing such that the sonotrode can be rotated about the longitudinal axis thereof. The sonotrode then comprises two boosters on each of the two sides. The inventive device has very high flexural rigidity when the vibration isolation is optimized.

According to one form of the present disclosure, the mount comprises a pipe section or a sleeve, which encompasses the two boosters at least partially. This means that the fastening of the ultrasonic resonator is not achieved directly by the contacting of the boosters, but that the two boosters carry a pipe section, which is then supported. This has the essential advantage particularly with pivot bearings that the two boosters are held by a single support, reducing the structural complexity.

The pipe section contacts the two boosters in the region of the nodal points. In this way, optimized oscillation isolation in the axial direction is achieved. The two boosters in the region of the nodal points thereof advantageously have a, particularly peripheral, contact surface for the mount. This nodal point can be determined relatively precisely in the booster and the contact surface can therefore be positioned with precision. In addition, a contact surface of this type is relatively easy to produce. The contact surfaces preferably have the same radius, which is to say they are on the same circumferential surface. The two boosters can be configured discretely as two components, or also as a single component. According to another variant, the contact surfaces have different radii, wherein the inner radius is larger than the outer one, so that the pipe section is easier to slide on.

The pipe section is particularly configured to have thin walls such that the movements in the radial direction are transmitted only insignificantly.

In order to allow precise positioning of the mount on the boosters, it is provided that at least one of the boosters has a peripheral collar abutting the contact surface, with the mount being disposed axially on this collar. In this way, it is ensured that the mount assumes its correct position with respect to the boosters and that due to the collar a displacement of the mount toward the boosters is prevented. Decoupling in the radial direction is achieved by the pipe section such that the pipe section can be grasped in the center thereof. This grip and bearing point oscillates neither in the radial, nor in the axial direction.

Advantageously, a collar extends across the mount at the two faces thereof at least partially in the radial direction. The assembly is carried out, for example, by shrink fitting the mount onto the boosters.

Improved fixation without additional means is achieved in that the boosters and the mount are connected to one another by means of a press fit. This is carried out, for example, by shrink fitting, as was already mentioned above. Another possibility to establish a connection, for example, is to plate the contact surfaces with solder and to solder on the mount, for example in a soldering furnace.

In order to provide ultrasonic processing within a wide temperature range, according to the present disclosure the press fit is effective across a temperature range of about −20° C. to about +150° C., particularly from about 0° C. to about +120° C., and even further from about +20° C. to about +100° C. To this end, the press fit is calculated such that the yield point of the weaker material is not exceeded and that the material expansions are such that the press fit is effective across the entire temperature range.

Simple fixation of the device to a frame is achieved in that the mount on the outside thereof comprises an installation means, via which the mount can be fastened to or supported on a machine frame or a clamping device. The installation means is located, for example, in the region of the axial center of the mount, where radial and axial vibration is nearly zero. The pipe section, for example, comprises a peripheral groove or a peripheral collar.

The invention has the advantage that, with the exception of the fit, no special shaping on the support point is required. This type of support has high flexural strength because no flexible elements are required. The rigidity results from the double support of the pipe section on the boosters. In addition, advantageously very little installation space in the radial direction is required because the pipe section can be configured in a sleeve shape and with a small wall thickness. Furthermore, very high radial forces can be absorbed by the support according to the invention. In addition, the vibration isolation is optimized.

Additional characteristics, details and advantages of the present invention will be apparent from the dependent claims and the following description with reference to a particularly preferred exemplary embodiment that is illustrated in the figures. The characteristics illustrated in the figures and mentioned in the claims as well as in the description can be employed for the invention either alone or in any arbitrary combination. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
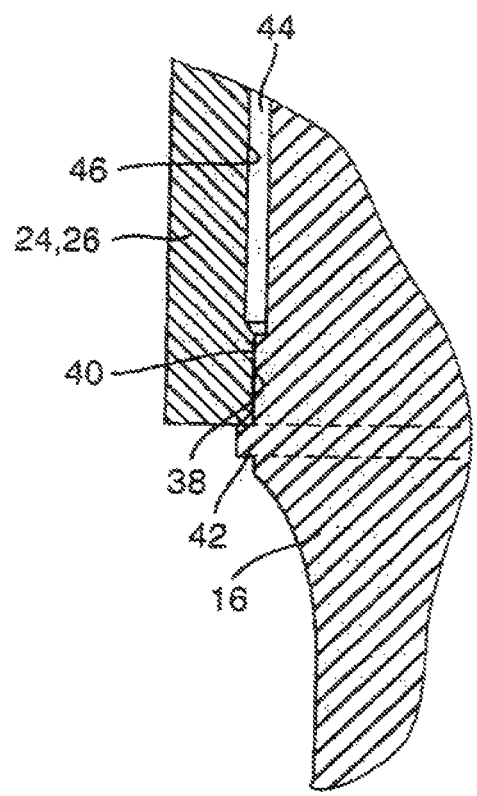

In order that the invention may be well understood, there will now be described various forms thereof, given by way of example, reference being made to the accompanying drawing, in which:

FIG. 1 is a longitudinal section of a support point of the device according to the invention; and FIG. 2 is an enlarged reproduction of section 11 according to FIG. 1.

DETAILED DESCRIPTION

The following description of the preferred embodiments is merely exemplary in nature and is in no way intended to limit the invention, its application, or uses.

FIG. 1 shows an ultrasonic resonator denoted overall with reference numeral 10, wherein in a converter 12 ultrasonic vibrations can be produced, and the converter 12 transmits these vibrations via a first booster 14 and a second booster 16 to a sonotrode 18. The booster 16 and the sonotrode 18 can be configured as one piece. It is also possible to configure the two boosters 14 and 16 and the sonotrode 18 as one component.

FIG. 1 shows an ultrasonic resonator 10, which is disposed vertically and wherein the sonotrode 18, at the lower end thereof, which is not shown, has a working surface, with which it rests against a workpiece 48. It is also conceivable, however, to provide a horizontal position of the sonotrode 18, so that the plane of the face has a vertical orientation.

Furthermore, it is possible to support the sonotrode 18 on both sides via bearing points 20, wherein its circumferential surface 22 represents the weld surface or working surface, which is indicated with dash-dotted lines in FIG. 1. In this case, not only the longitudinal vibrations, but above all the radial vibrations act on the workpiece 48. The position of the sonotrode 18, which is to say the radial or horizontal orientation, is independent of whether the face or the circumference is used for processing.

The bearing point 20 is formed primarily by a mount 24, which has a pipe section 26 or a sleeve, which is supported on the two boosters 14 and 16. The pipe section 26 in turn, in the region of the axial center 28 thereof, has installation means 30, which are formed by a peripheral groove 32 or a peripheral collar 34. Via these installation means 30, the pipe section 26 is fastened to a machine frame or a clamping device. Special vibration isolation is not required when fastened to a machine frame or clamping device. The fastening can simply be screwed or pressed on, for example.

FIG. 2 shows an enlarged reproduction of section 11 according to FIG. 1, wherein the region denoted with numeral 36 is configured in the same manner. The booster 16 has a peripheral contact surface 38, on which the pipe section 26 rests. The pipe section 26 likewise has a peripheral contact surface 40, which is dimensioned such that the two contact surfaces 38 and 40 rest against one another by press fit.

Furthermore, it is apparent from FIG. 2 that the booster 16 has a peripheral collar 42, on which the pipe section 26 rests axially. The protrusion of the collar 42 beyond the contact surface 38 is dimensioned such that by heating the pipe section 26 the section can be pushed over the collar 42 and the pipe section 26 can then be shrink-fitted onto the booster 16 or the contact surface 38 after cooling. The contact surface 38 is located in a nodal point of the booster 16. This prevents or significantly reduces the transmission of the longitudinal amplitude to the mount 24. The radial amplitude, which achieves its maximum in the region of the contact surface 38, is absorbed by the pipe section 26. The radial amplitude, however, is considerably reduced toward the center 28.

Abutting the two contact surfaces 38 and 40 are cut-outs 44 and 46 of the boosters 16 and pipe section 26. In this way, it is ensured that the pipe section 26 rests on the contact surface 38 of the booster 16 only via the contact surface 40. As was already mentioned, the design of the region 36 of the bearing point 20 is configured accordingly. The booster 14 again comprises a contact surface, which rests against a contact surface of the pipe section 26, and a peripheral collar corresponding to the collar 42 may also be provided.

The bearing point 20 of this device according to the invention is designed considerably smaller in the radial direction than according to the state of the art, and almost no oscillations are transmitted in the longitudinal and radial directions.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A device for the ultrasonic processing of a workpiece using an ultrasonic resonator and optionally a counter-tool, with the workpiece resting against the ultrasonic resonator and the ultrasonic resonator comprising:

a converter having a longitudinal centerline;

a sonotrode;

a first booster disposed between the converter and the sonotrode and including a first nodal point, a contact surface at the first nodal point, and a first peripheral collar extending radially and outwardly from the contact surface of the first booster in a direction away from the longitudinal centerline and proximate the first nodal point;

a second booster disposed between the converter and the sonotrode and connected to the first booster along a longitudinal axis of the first booster, the second booster including a second nodal point, a contact surface at the second nodal point, and a second peripheral collar extending radially and outwardly from the contact surface of the second booster in a direction away from the longitudinal centerline and proximate the second nodal point; and a mount mounted around the first booster and the second booster and including a pipe section, the pipe section being supported and clamped between the first peripheral collar and the second peripheral collar, the first and second peripheral collars functioning as axial stops for the pipe section;

wherein the pipe section contacts the first and second boosters in the region of the nodal points without any flexible elements between the pipe section and the two boosters in the region of the nodal points; the pipe section being radially compliant, such that it absorbs radial forces and decouples the first and second boosters;

wherein the pipe section further includes:

a first inner peripheral surface and a second inner peripheral surface extending radially inwards from opposing ends of the pipe section, the first inner peripheral surface contacting the contact surface at the first nodal point, the second inner peripheral surface contacting the contact surface at the second nodal point, a space being defined between the pipe section and the first booster and the second booster; and wherein each of the boosters include cut-outs that extend radially inwards and the pipe section includes a cut-out that extends outwards relative to the longitudinal centerline of the converter and extends from the first inner peripheral surface to the second inner peripheral surface such that the pipe section rests only on the contact surfaces with the first and second boosters.

2. The device according to claim 1, characterized in that the contact surfaces of the two boosters are located in the same circumferential surface or circumferential plane.

3. The device according to claim 1, characterized in that the boosters and the mount are connected to one another by one of a press fit and a screw assembly.

4. The device according to claim 3, characterized in that the press fit is effective across a temperature range of about −20° C. to about +150° C.

5. The device according to claim 3, characterized in that the press fit is effective across a temperature range of about +20° C. to about +100° C.

6. The device according to claim 1, characterized in that the mount, on the outside thereof, comprises an installation means, via which the mount can be fastened to a machine frame or a clamping device.

7. The device according to claim 6, characterized in that the installation means lies in the region of the axial center of the mount.

8. The device according to claim 6, characterized in that the installation means is a peripheral groove or a peripheral collar.

9. The device according to claim 1, characterized in that the ultrasonic resonator carries a mount on one side or both sides.

* * * * *